March 24, 1953 F. B. RYAN 2,632,265
DIGGING BLADE FOR DITCHING AND CABLE LAYING MACHINES
Filed Aug. 23, 1949
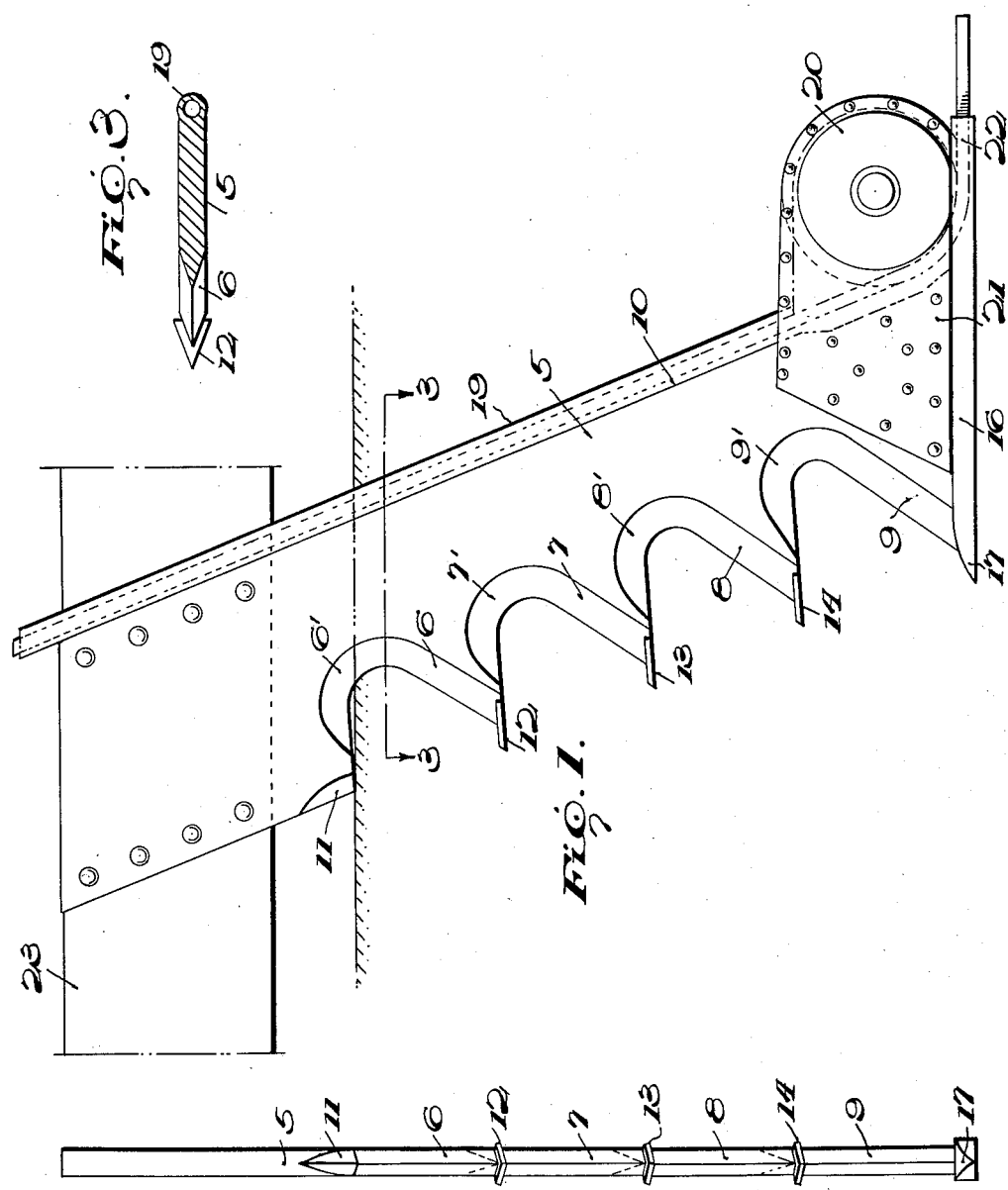
INVENTOR.
Francis B. Ryan
BY
Cameron, Kerkam & Sutton.

Patented Mar. 24, 1953

2,632,265

UNITED STATES PATENT OFFICE 2,632,265

DIGGING BLADE FOR DITCHING AND CABLE LAYING MACHINES

Francis B. Ryan, Chariton, Iowa

Application August 23, 1949, Serial No. 111,947

5 Claims. (Cl. 37—193)

This invention pertains to an improved blade for ditching and cable laying machines and comprises broadly a ditching and cable laying blade structure which is novel in shape and manner of operation and which penetrates with a much higher efficiency than other ditching blades presently in existence.

Extensive experiments with my original blade as disclosed in my copending application, Serial No. 789,017, filed December 1, 1947, have established that certain fundamental changes in the cutting edges of the blade and in their shape will increase the efficiency and the ease of penetration of the blade and will reduce the force necessary to draw the blade through the ground at the desired depth.

It is therefore one object of this invention to evolve a ditching blade structure of such novel configuration as to increase the ease of penetration of the blade into the surface of the ground and reduce the force necessary to draw the blade through the ground.

It is another object of this invention to evolve such a blade structure of novel and improved shape.

It is a further object of this invention to provide such a blade structure which will operate through the ground more rapidly and with greater ease than former structures of this type.

Other and further objects of this invention will become apparent as this specification proceeds.

Referring to the drawings,

Fig. 1 is a side view of the improved blade structure showing the curved and rearward sloping shape of the cutting edges;

Fig. 2 is an end view of the blade structure looking toward the leading or cutting edge thereof; and Fig. 3 is a cross-sectional view of the blade taken from above on line 3—3 of Fig. 1.

In the drawings, 5 indicates the ditching or cutting blade which is preferably formed of heavy plough steel and which is shaped broadly overall in the shape of a parallelogram with its extremities lying in parallel planes, the downwardly extending body of the blade being rearwardly inclined to the direction of travel and making an angle of approximately 30° to the plane of the upper surface thereof. Blade 5 carries upwardly and rearwardly inclined cutting edges 6, 7, 8 and 9 progressively disposed downwardly along its forward or entering edge, said cutting edges being arcuately shaped at their upper extremities 6', 7', 8' and 9' in a smooth curve to define a substantially arcuate upper cutting surface. As shown in Fig. 1, the rearward inclination of cutting edges 6, 7, 8 and 9 gradually increases with each succeeding edge, i. e., the inclination of cutting edge 7 is greater than that of cutting edge 6, the inclination of cutting edge 8 is greater than that of cutting edge 7 and the inclination of cutting edge 9 is greater than that of cutting edge 8. In addition, it will be seen that the curved upper extremity 6' of cutting edge 6 is farthest removed from the rear edge 10 of cutter blade 5 and that the curved upper extremities 7', 8', and 9' of succeeding edges 7, 8 and 9 approach, progressively, more closely the rear edge 10 of blade 5. Each of the curved upper cutting surfaces is progressively cut deeper into the leading edge of blade 5, from the upper portion to the lower portion thereof. Each of the blades resembles a double edged sickle in shape, the curved portion of the sickle being upwardly and rearwardly disposed in the leading edge of blade 5.

Auxiliary upper cutting or entering edge 11 is shown preferably provided in the leading surface of blade 5 above the forward curved upper extremity 6' of cutting edge 6.

Cutting edges 6, 7 and 8 are provided at their lower forward extremities with triangularly shaped toes or penetrating members 12, 13 and 14, which triangular toe members make the initial or penetrating cut for their respective cutting edges 6, 7 and 8. As shown, triangular entering toes 12, 13 and 14 are preferably upwardly beveled and are brought to a point at their forward extremities and flattened to a plane surface on their lower surfaces. These entering triangular toes are preferably formed integral with the lower forward extremity of cutting edges 6, 7 and 8.

Cutter point or runner 16 is shown provided along the lower extremity of blade 5 and is preferably made integral therewith and lies in a plane parallel to the plane of the lower extremity of blade 5. Runner 16 is preferably rectangular in cross section and is brought to a point or entering edge 17 at its forward extremity. Entering edge 17 of runner 16 is sharpened and preferably triangular in shape and acts as entering edge or point for lower cutting edge 9 and blade 5. Runner 16 is preferably rectangular in cross section and of such dimensions as to extend outwardly beyond the lateral edges of blade 5 an appreciable distance to form a running surface for the blade.

A cable guide tube 19 is preferably provided along the sloping rearward edge of blade 5 and is designed to freely receive and pass cable from a drum mounted upon the vehicle frame to which cutter blade 5 is attached at its upper extremity. A pulley or roller 20 is shown rotatably mounted as in bracket 21 which is appropriately bolted or riveted to the rearward lower extremity of cutter blade 5. Pulley 20 is designed to freely render cable passing down cable guide tube 19 and out of the rearward bored extremity 22 of runner 16.

As shown, cutter blade 5 is designed to be bolted, riveted or otherwise affixed to an adjustable beam or support member 23 which is adjustably mounted on the vehicle body which provides support and motive power for the cutter blade 5. Cutter blade 5 is preferably affixed to beam 23 in such fashion as to extend downwardly and rearwardly therefrom and preferably makes an angle of approximately 30° therewith. This angular disposition of cutter blade 5 below the body of the vehicle is essential in order that the optimum penetrating effect may be procured from cutting edges 6, 7, 8 and 9, and in order that penetration of cutter blade 5 may be effected with the lowest possible output of power and with the highest efficiency.

Curving and bringing to a beveled sharpened edge the upper extremities 6′, 7′, 8′, and 9′ of cutting edges 6, 7, 8 and 9 has been determined experimentally to eliminate the impacting of dirt at these points, which impacting develops at the apices of rectangular teeth, and which results in greatly increased friction and drag on the blade. By curving and beveling these upper extremities of the cutting edges this impacting of dirt and the resultant drag and friction have been eliminated and the ease of cutting of the blade has been greatly increased.

The power required to pull the blade has been further reduced by the stepped-back arrangement of the cutting edges and by progressively increasing the angularity of the cutting edges from top to bottom of the blade. This angularity of the cutting edges allows each edge to make a gradual, cutting penetration of the ground and eliminates the resistance presented by rectangular edges. The recessed curvature of the upper cutting edges results in the lines of force extending back from each edge reaching the void created by the cut made by the edge next adjacent above much sooner than with the rectangular or single blade and greatly increases the ease of passage of the blade through the soil. It will be seen that the curved upper portion of each cutting edge falls in behind the lower inclined portion of the cutting edge immediately above it and therefore runs in the void or cut made by the lower inclined portion of the edge above. This greatly increases ease of penetration and reduces blade drag.

The novel cutter blade operates as follows:

With the cutter blade 5 appropriately affixed below a suitable carrier or vehicle the blade is adjusted upwardly or downwardly to make a cut of the desired depth. The vehicle is then started in a forward direction and the cutting edges 6, 7, 8 and 9 make penetrations into the surface of the ground, being assisted in this penetration by triangular entering toes 12, 13, 14 and 17 which tend to pull the cutting edges into the ground, and once having penetrated, tend to hold the cutting edges at the proper depth. Due to the progressive rearward inclination of the surfaces of cutting edges 6, 7, 8 and 9 friction is greatly reduced, and due to the curved and beveled upper surfaces of the cutting edges impacting of dirt at these points is eliminated, further increasing the ease of penetration of the cutting edges. The rearward slope of the cutting edges further increases the digging action of these edges and causes an immediate penetration of the entire cutter blade to the depth desired in the operation. Due to the fact that the forward extremity of the upper curved portion of each cutting edge impinges in behind the lower entering portion of the cutting edge immediately thereabove, each edge cuts into the void made by the edge above, further increasing the ease of penetration and decreasing friction and strain on the blade. As a result of the stepped-back or progressively deeper cut of each lower succeeding edge curved cuts may be made with this blade with considerable ease. In former blades of the rectangular or vertical type curved cuts were practically impossible to make and the attempt to make such a cut frequently resulted in freezing of the machine or damage to the blade.

The novel cutter blade may be made in any desired dimensions without departing from the spirit of this invention. However, for purposes of illustration only, the present blade may be approximately 16 inches in width for its full length of some 48 inches and each cutting edge may have a drop of 9 inches from its extreme upper to its extreme lower extremity. Runner 16 disposed along the lower edge of the blade may be on the order of 28 inches in length by 2¼ inches square. With respect to the stepped-back disposition of each of the cutting edges, the outer edge at the curved apex of cutting edge 6 may be approximately 9½ inches from the rear edge 10 of the blade, the outer apex of edge 7 may be approximately 9 inches from the rear edge of the blade, the outer edge of the apex of blade 8 may be approximately 8½ inches from the rear edge of the blade and the outer edge of the apex of cutting edge 9 may be approximately 8 inches from the rear edge of the blade. It will be understood that these dimensions may be varied at will within the spirit of this invention, the overall configuration of the blade and the cutting edges thereof comprising the essence of the invention.

Upper entering edge or cutting surface 11 is of importance in that it provides a knife edge impinging on the upper surface of the ground to allow easy travel for the face of the blade above cutting edge 6, and eliminating friction at this point. A squared-off or unfinished edge greatly increases friction, tends to impact dirt adjacent the forward upper edge of the blade on the surface of the ground and impairs efficiency.

The angularity or forward slope of rear edge 10 and cable tube 19 of blade 5 makes it possible to lay cable with the novel blade without overbending or straining the cable. If it is desired to lay extremely stiff, heavy cable this angularity may be increased to decrease the angle of bend of the cable at pulley 20 and to avoid damage to the cable from over-bending.

The dimensions of the blade may be varied within wide ranges without departing from the spirit of this invention. The configuration of the cutting edges and the overall configuration of the blade are of the essence of the invention. Attention is directed to the appended claims for the limitation of the scope of the invention.

What is claimed is:

1. In a ditching blade, a blade body, a series of rearwardly inclined cutting edges disposed downwardly along the forward edge of said blade body, triangular entering toes horizontally disposed at the lower forward extremity of each cutting edge, and a runner disposed along the lower edge of said blade body.

2. In a ditching blade, a blade body, an inwardly extending upwardly curving upper cutting edge disposed adjacent the upper extremity of said blade body, inwardly inclined upwardly curved cutting edges disposed below said upper cutting edge in said blade body and extending progressively deeper into said blade body, triangular entering toes horizontally disposed at the lower forward extremity of each cutting edge, and a pointed runner disposed along the lower surface of said blade body.

3. In a ditching blade, a blade body, inwardly inclined and forwardly curving cutting edges disposed downwardly along the forward edge of said blade body, each of said cutting edges progressively extending deeper into said blade body, triangular horizontal entering edges for said cutting edges disposed at the lower extremities thereof, and a runner disposed along the lower edge of said blade body and extending forwardly and rearwardly thereof.

4. In a ditching blade, an angularly disposed blade body, rearwardly inclined upwardly curved cutting edges disposed downwardly along the forward edge of said blade body and of progressively increasing depth therein, triangular entering toes for said cutting edges right angularly disposed with respect to the plane of the blade disposed at the lower extremity of each cutting edge, and a longitudinal runner disposed along the lower extremity of said blade body.

5. In a ditching blade, an angularly disposed blade body, rearwardly inclined upwardly curved cutting edges disposed progressively along the forward edge of said blade body and of progressively increasing depth therein, horizontal entering points for said cutting edges disposed at their lower extremities, and a runner longitudinally disposed along the lower extremity of said blade body.

FRANCIS B. RYAN.

REFERENCES CITED

The following references are of record in the file of this patent:

UNITED STATES PATENTS

| Number | Name | Date |
|---|---|---|
| 123,479 | Hooton | Feb. 6, 1872 |
| 194,665 | Farmer | Aug. 28, 1877 |
| 332,126 | White | Dec. 8, 1885 |
| 1,491,398 | Heikkla | Apr. 22, 1924 |
| 1,886,511 | Gledhill | Nov. 8, 1932 |
| 2,155,044 | Gray et al. | Apr. 18, 1939 |

FOREIGN PATENTS

| Number | Country | Date |
|---|---|---|
| 432,824 | Germany | Aug. 16, 1926 |
| 573,444 | Great Britain | Nov. 21, 1945 |